July 28, 1959 R. B. HAMMETT 2,897,451

MULTIFREQUENCY DEVICES AND SYSTEMS ASSOCIATED THEREWITH

Filed Feb. 27, 1958 2 Sheets-Sheet 1

INVENTOR
ROBERT B. HAMMETT

BY Cushman, Darby & Cushman
ATTORNEYS

INVENTOR
ROBERT B. HAMMETT

BY Cushman, Darby & Cushman
ATTORNEYS

United States Patent Office 2,897,451

Patented July 28, 1959

2,897,451

MULTIFREQUENCY DEVICES AND SYSTEMS ASSOCIATED THEREWITH

Robert B. Hammett, New Orleans, La.

Application February 27, 1958, Serial No. 717,989

30 Claims. (Cl. 331—60)

This invention relates to excitation devices and systems for use therewith. In particular, one aspect of the invention relates to circuits capable of producing gain or negative resistance and the adaptation of such circuits for use as excitation devices to selectively and simultaneously generate oscillations at a plurality of frequencies, and another aspect of the invention relates to systems incorporating such excitation devices, which systems also incorporate a plurality of secondary circuits that perform some useful function such as, for example, producing oscillations, producing amplifications, or producing negative resistance.

Although a negative resistance cannot be represented by a physical resistor, it has long been used by those skilled in the art for discussions thereof since it represents a source from which energy is obtained to supply the losses which take place in a system. Of course, a negative resistance may exist between two terimnals without any load connected thereacross, but to utilize the negative resistance, a signal must be supplied to it. A negative resistance can be visualized as an element which supplies energy in response to a signal impressed upon it, and the term "negative resistance" is used in accordance with such visualization throughout this specification.

As set forth above, one aspect of this invention relates to excitation devices for selectively and simultaneously producing oscillations, and a general object of this invention is to provide a device which is capable of producing oscillations at a plurality of frequencies. It should be understood that the excitation devices provided by this invention differ from the so-called "multimode" oscillators which are well-known in the art because the devices provided by this invention are capable of producing simultaneous oscillations at a plurality of unrelated frequencies, whereas the multimode oscillators are only capable of producing a plurality of simultaneous oscillations at related frequencies or oscillations of only one of a plurality of unrelated frequencies at any given instant of time. As will become apparent hereinafter, the excitation devices provided by this invention may produce a plurality of simultaneous oscillations at related frequencies, at unrelated frequencies, or at mixtures of related and unrelated frequencies.

More particularly, an object of this aspect of the invention is to provide a multifrequency excitation device comprising electronic amplifying means, and means coupled to the amplifying means for causing the amplifying means to simultaneously produce oscillations at a plurality of frequencies which are not necessarily related.

A further object of this aspect of the invention is to provide an excitation device of the above described character which utilizes a negative resistance arrangement, an arrangement for producing an equivalent negative resistance, or a positive feedback arrangement.

Still other and further objects of this aspect of the invention are (1) to provide an excitation device of the above described type comprising primary means capable of simultaneously generating oscillations at a plurality of unrelated frequencies and secondary means coupled thereto for selecting the frequencies of simultaneous oscillations produced and (2) to provide an excitation device in accordance with (1) above wherein means are incorporated in the secondary means for preventing unrestrained oscillations within the system.

A second aspect of the present invention, as set forth above, is concerned with a selective electronic arrangement incorporating a plurality of sub-circuits which may be used as oscillators, bi-stable elements, amplifiers, means for exciting a series of similar sub-circuits, or the like. Because of the versatility afforded by such an arrangement, it will find particular utility when adapted for use as a binary register in an electronic computer, when adapted for use as a single wire access multi-coordinate electronic memory system, and when adapted for use in, or as, various other types of devices which may utilize a single device to excite a plurality of sub-circuits, or a plurality of sub-circuits to excite a single device.

Accordingly, it is an object of this invention to provide a selective electronic system comprising an excitation device adapted to produce simultaneous oscillations at a plurality of frequencies within a predetermined band of frequencies and a plurality of isolated secondary circuits tuned to different frequencies within the predetermined band and coupled to the excitation device, wherein each of said secondary circuits may be excited by the primary means to serve a useful function, and wherein the primary means may be excited by any selected one of the secondary circuits to produce oscillations of a selected frequency.

More particularly, it is an object of this aspect of the invention to provide a system wherein secondary circuits are coupled to primary excitation devices of the negative resistance type, the secondary circuits possessing impedance characteristics variable with frequency such that within a given band of frequencies the impedance either increases or decreases in correspondence with the tuned frequencies of particular secondary circuits. As will be apparent hereinafter, whether or not an increase or decrease in impedance is encountered depends upon the particular network connection which in turn is dependent upon the type of excitation device used.

A still further object of this invention is to provide a selective electronic arrangement comprising primary negative resistance means adapted to produce simultaneous oscillations at a plurality of frequencies within a predetermined band for exciting a plurality of secondary circuits, and a plurality of isolated secondary circuits tuned to different frequencies within said predetermined band, wherein said secondary circuits are inductively coupled to said primary negative resistance means whereby any of said secondary circuits may be simultaneously excited, wherein each of said secondary circuits has induced therein a negative resistance when excited by said primary negative resistance means and wherein means are provided in each secondary circuit for translating the frequency of the negative resistance induced in each secondary circuit from a frequency within a band of frequencies centered about the tuned frequency of the particular secondary circuit to a frequency within a band of frequencies centered about zero frequency (D.C.).

More particular objects of this invention are (1) to provide a selective arrangement of the above described type incorporating means in each of the isolated subcircuits to prevent unrestrained oscillations thereof and (2) to provide a selective electronic system of the above described type wherein means are incorporated within the system for selectively placing any one of the plurality of isolated sub-circuits in an excited condition and means are incorporated in the system for selectively returning any selected one of the plurality of isolated secondary circuits to a non-excited state after the selected secondary circuit has been excited.

Yet another and still further object of this invention is to provide a selective electronic arrangement of the above-described type wherein a unitary primary means may be used to excite secondary circuits, and tertiary circuits similar to the above described secondary circuits, or to excite any number of members of a chain of sub-circuits which are coupled to one another.

It is also an object of this invention to provide secondary circuits which may be used in the selective electronic systems provided by this invention for producing oscillations, for producing negative resistance, or for producing amplification, and which may also be used in the selective electronic systems provided by this invention to serve as bistable oscillatory elements.

The term bistable device as used in this specification denotes a device capable of operating in two states, one oscillatory and one non-oscillatory.

Another and important object of this invention is to provide a system incorporating a primary excitation device and secondary circuits coupled thereto for excitation thereby, wherein the secondary circuits comprise means coupled to the primary excitation device to cause negative resistance and thereby oscillations at a given frequency to be induced therein, and means to control the amplitude of the oscillations induced comprising means for varying the maximum level of oscillations in response to a modulating signal.

Still other objects of this invention will become apparent to those of ordinary skill in the art after considering the following detailed descriptions of the exemplary embodiments of the invention in conjunction with the annexed drawings, wherein.

Figure 8:
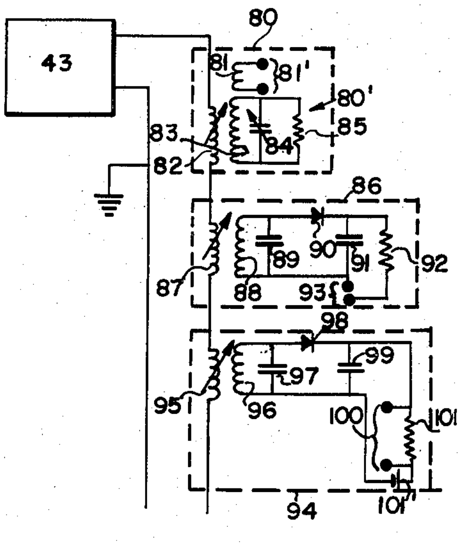
Figure 7:
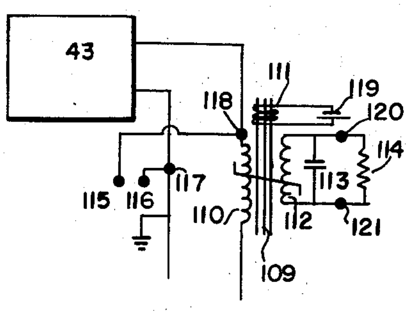
Figure 4:
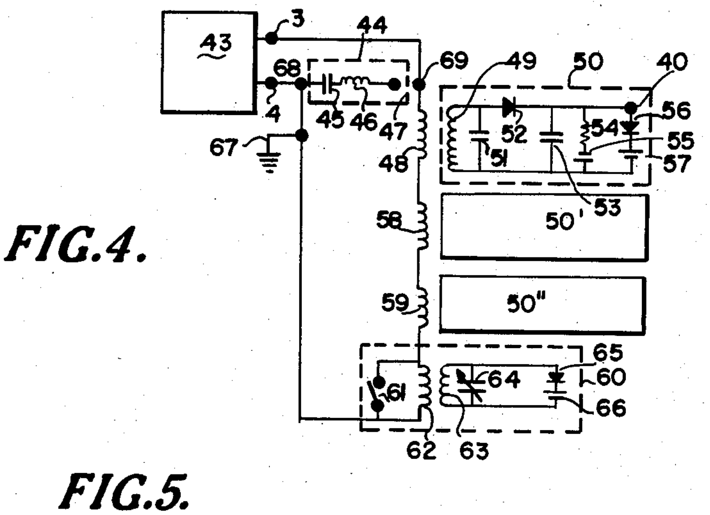
Figure 5:
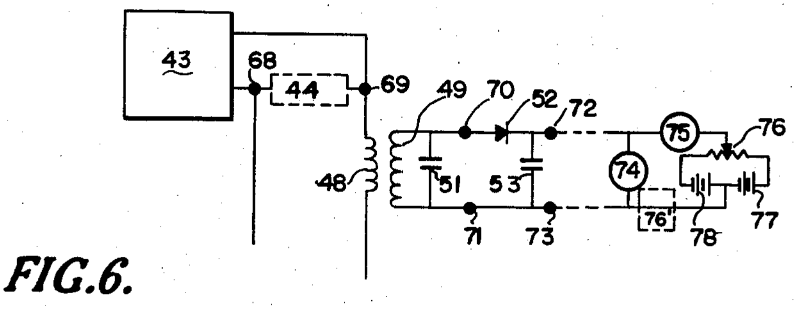
Figure 6:
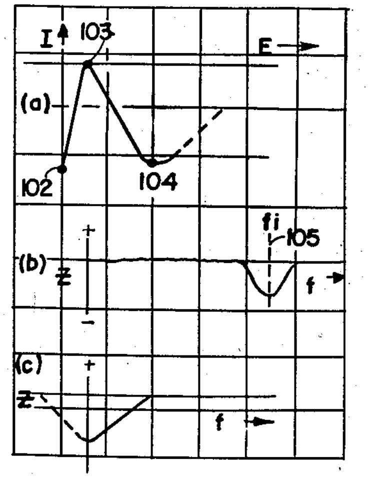
Figure 9:
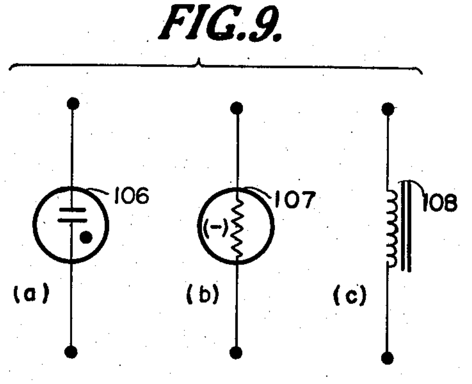

Figure 4 is a schematic representation of a system provided in accordance with this invention showing (1) a plurality of isolated secondary circuits in the form of bistable tuned oscillators, (2) the manner in which the sub-circuits are coupled to a primary negative resistance means, (3) a means for selectively placing the secondary circuits in an excited state, and (4) a means for selectively returning the secondary circuits to a non-excited state after they have been excited;

Figure 5 is a schematic representation of part of the system presented in Figure 4, but incorporating in the secondary circuit a variable biasing means, an ammeter and a voltmeter for purposes of explaining operation of the secondary circuit;

Figure 6 presents graphical representations showing the characteristics of the secondary circuits presented in Figure 5;

Figure 7 is a schematic representation of a part of a system having bistable secondary circuits provided in accordance with this invention, which system incorporates magnetically biased couplings between the primary and the secondary circuits incorporated therein;

Figure 8 is a schematic representation of various amplifying arrangements which may be provided in accordance with this invention, and;

Figure 9 presents, in schematic form, several limiting devices which may be incorporated in secondary circuits of the type shown in Figure 4 to prevent unrestrained oscillations thereof.

When consideration is given to the above objects and following description, it should be understood that the term "unrelated" frequencies designates frequencies which are not harmonically related. Also, the terms "excited" and "excitation" as used herein designate respectively operation of a secondary circuit in an oscillatory state and placing of a secondary circuit in an oscillatory state.

Figure 1:
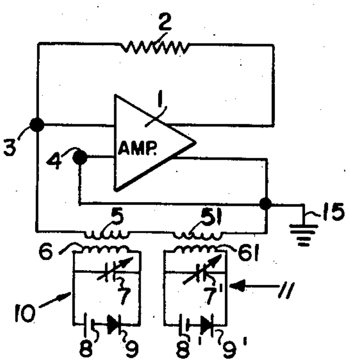
Figure 1 is a schematic representation of a shunt negative resistance circuit arrangement provided by this invention and of the type which may be used in accordance with this invention for exciting isolated secondary circuits or for being excited thereby.

By referring more particularly to the drawings, it will be noted that in Figure 1 the equivalent circuit for a shunt negative resistance is presented. The circuit incorporates an amplifier 1 and a resistance 2 which is coupled between the output and input terminals of the amplifier 1 thereby providing a positive or regenerative feedback network. Such a circuit is designed to produce a shunt or short circuit stable negative resistance across points 3 and 4 at all frequencies for which the equivalent positive resistance placed across points 3 and 4 is less than the negative resistance generated between those points. However, with this negative resistance generating circuit, as with any other voltage negative resistance generating circuit, oscillations are produced when the equivalent positive resistance placed across the negative resistance is greater than the generated negative resistance.

In the circuit of Figure 1, two coils, 5 and $5^1$ are connected between points 3 and 4, and inductively coupled to each coil is a tuned secondary circuit. The secondary circuit generally designated by the numeral 10, which is inductively coupled to coil 5, comprises a resonant network consisting of coil 6 and capacitor 7 and a conventional limiting means consisting of biasing battery 8 and rectifier 9. Secondary circuit 10 may be tuned to any particular frequency within the range defined by the limitations of adjustment of capacitor 7, however, for purposes of this discussion, it may be assumed that secondary circuit 10 is tuned to frequency $f_1$. Secondary circuit 11 comprises the same components as secondary circuit 10, and for this reason the circuit elements of secondary circuit 11 have been designated by the prime of the numerals used for designating the components of secondary circuit 10. Secondary circuit 11 is, however, for purposes of this discussion, assumed to be tuned to a frequency $f_2$.

As stated above, oscillations will be produced for any and all frequencies at which the equivalent positive resistance placed across points 3 and 4 is greater than the negative resistance generated between those points. This condition for oscillation is met at frequencies $f_1$ and $f_2$ in the circuit of Figure 1, in accordance with the example used, because the two tuned circuits 10 and 11 are tuned to frequencies $f_1$ and $f_2$ respectively. At frequencies $f_1$ and $f_2$ the impedance of the particular tank circuit is high, and as a result this high impedance is reflected to the associated primary 5 or $5^1$ respectively. As a result the positive resistance across points 3 and 4 is higher than the negative resistance between those points and oscillations are produced.

As one skilled in the art will appreciate, any device which possesses an impedance characteristic variable with frequency may be used instead of the inductively coupled arrangement shown. It is only necessary that a secondary circuit with an impedance variation characteristic of the above prescribed type is employed; that is, one which has an impedance variable from below the absolute value of the negative resistance to above the absolute value of the negative resistance.

To prevent non-linear operation of the source of negative resistance, each tuned secondary circuit is provided with the necessary limiting means, which as set forth above, may comprise a conventional diode and battery limiter.

With the circuit of Figure 1 it is possible to produce simultaneous oscillations at any frequency within the bandwidth of the source of negative resistance. The frequencies produced may be related or unrelated and thus the circuit is capable of simultaneously producing a plurality of frequencies. The production of unrelated simultaneous oscillations at a plurality of frequencies is a unique and important feature of this device for, as will be appreciated by those skilled in the art, such a circuit has definite advantages over the conventional multimode oscillators which do not operate to produce unrelated simultaneous oscillations, but as suggested above, are designed to operate at any one of a number of frequencies or to operate in a manner whereby a basic frequency and harmonics thereof are produced.

To understand how simultaneous oscillation by a unitary device is possible, it is only necessary to appreciate the linearity requirement placed on the source of negative resistance. Any linear network, including active networks, will pass frequencies within a predetermined band of frequencies, its "bandpass," with no intermodulation. A source of negative resistance is theoretically a linear network, and in practice it has been found that it can be made as linear as any active device such as, for example, an amplifier. The seemingly inconsistent requirements of (1) linearity and (2) restraint on the level of oscillation is achieved according to this invention, by locating the necessary non-linear limiter within the secondary circuit where it has little or no effect on the linearity characteristics of the primary source of negative resistance. The limiting is accomplished by effectively limiting the level of oscillations in the secondary circuit and thereby limiting the level of oscillations which are induced by the secondary in the primary circuit so that the primary circuit is not driven into non-linear operation.

It is, of course, necessary for isolation to tune the secondary circuits to different frequencies. The "Q" of the secondary circuits and the frequency separation will determine the degree of reactive isolation. Thus, a theoretical source of linear negative resistance coupled to differently tuned very high "Q" circuits will permit the oscillation of one or many without significantly changing the amount of negative resistance coupled to any circuit. It has been found in practice that the necessary linearity and tuning are easily achieved.

The incorporation of limiting means in the secondary circuits is an important feature of this invention, for if the limiting means were not provided in the secondary circuits of Figure 1, then only one of the secondary circuits, instead of both, will oscillate since the best coupled-highest "Q" circuit will cause the source of negative resistance to operate in a non-linear range whereby the dynamic value of the negative resistance is increased to equal its own effective positive resistance. Naturally, a limiter of the type incorporated in the secondary circuit could be placed across primary coils 5 or 5¹ to provide the limiting, however, preferably the limiting means is incorporated in the secondary circuits as the efficiency of the coupling need not be as high as required when the limiter is placed in the primary circuit for suppression of the "effective intermodulation" or cross talk. When the circuit is adapted for use without inductive coupling the limiter would, of course, be part of the primary circuit, in many applications at least.

It should be understood that two secondary circuits are incorporated in the disclosure of Figure 1 for exemplary purposes only, and that as many secondary circuits as desired may be used according to the invention. Moreover, various modifications of the circuit shown in Figure 1 may be made without departing from the scope and spirit of this invention. For example, a common biasing battery may be used for the plurality of secondary circuits merely by connecting the leads attached to the respective arrowheads or cathodes together and then connecting the common lead to the negative terminal of a battery having a grounded positive terminal.

It should also be understood that although inductive isolation transformer type coupling is used between the primary circuit and the secondary circuit in the exemplary embodiment of the invention presented in this specification, such coupling is not essential to the operation of this device, but serves to permit, if desirable, a common point of connection (ground) of the secondary circuits. It is completely feasible to couple secondary circuits to the primary in an autotransformer series arrangement so that a part of each secondary circuit is part of the primary circuit. In fact, as will be appreciated by one skilled in the art, there are almost an unlimited number of ways in which the desired coupling can be achieved. Of course, various resistance, capacitance and inductance combinations offer advantage in specific applications.

Figure 2:
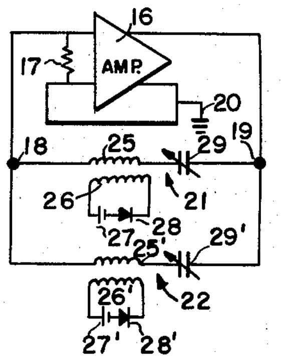
Figure 2 is a schematic representation of a series negative resistance circuit arrangement provided by this invention and of the type which may also be used in accordance with this invention for exciting the isolated secondary circuits or for being excited thereby.

Figure 2 presents another device capable of producing oscillations at a plurality of frequencies simultaneously that is similar to the circuit presented in Figure 1. The circuit of Figure 2, however, uses an amplifier 16 connected in a series negative resistance or open circuit stable negative resistance arrangement. A resistance 17 is connected across the input terminals of amplifier 16 and two series resonant circuits 21 and 22 are coupled between the output terminal 19 and the input terminal 18 of amplifier 16.

The series resonate circuits 21 and 22 comprise coils 25 and 25¹, and capacitors 29 and 29¹ respectively.

Coupled to each coil is a secondary circuit.

The secondary circuit associated with coil 25 comprises a coil 26 across which is placed a conventional limiter consisting of a bias battery 27 and rectifier or diode 28. The secondary circuit associated with coil 25¹ comprises the same circuit components as that associated with secondary circuit 25 and for this reason the components of the latter secondary circuit have been designated by prime numerals. Tuning is achieved in this arrangement by adjusting capacitors 29 and 29¹ to frequencies of, for example, $f_1$ and $f_2$.

In the circuit of Figure 2, oscillations are produced when the impedance between points 18 and 19 is low, as opposed to high as with the Figure 1 arrangement. The current conducted from point 19 to point 18 via the series resonate networks is converted to a signal or input voltage by the resistance 17 to control the amplifier. Thus, Figure 2 may be designated as a current controlled negative resistance, however, it should be understood that the terms current controlled negative resistance, series negative resistance and open circuit stable negative resistance all mean the same thing under conventional designation and throughout this specification, just as shunt, voltage controlled, and short circuit stable negative resistance are equivalent terms which define the arrangement of Figure 1.

Figure 3:
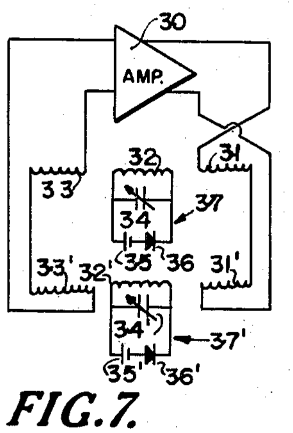
Figure 3 is a schematic representation of a multifrequency oscillator provided by this invention which, like the circuit arrangements of Figures 1 and 2, may be used in accordance with this invention for exciting the isolated secondary circuits or being excited thereby.

Figure 3 presents still another circuit which may be provided in accordance with this invention for producing simultaneous oscillations at a plurality of unrelated frequencies. By reference to the drawings, it will be noted that an amplifier 30 is used in the circuit of this figure, two primary coils 31 and 31¹ are coupled in series across the output of amplifier 30, and two secondary coils 33 and 33¹ are serially coupled across the input terminals of amplifier 30. Inductively coupled between primary coil 31 and secondary coil 33 is a tuned secondary circuit 37 comprising a parallel resonate network of coil 32 and capacitor 34 and a conventional limiter connected thereacross consisting of bias battery 35 and rectifier or diode 36. Inductively coupled between primary coil 31¹ and secondary coil 33¹ is a secondary circuit 37¹ comprising the same components as secondary circuit 37 and like components are designated by prime numerals. For purposes of illustration and in accordance with the above examples, secondary circuit 37 may be assumed to be tuned to frequency $f_1$ and secondary circuit 37[1] may be assumed to be tuned to frequency $f_2$. Oscillations will be produced by the circuit arrangement of Figure 3 for any frequency at which the loop gain is equal to, or greater than, unity and in accordance with the illustrative tuning selected, this condition will be met at frequencies $f_1$ and $f_2$.

The circuits of Figures 1, 2, and 3 all function as multifrequency excitation devices and all incorporate an amplifying means having output and input terminals and means coupled thereto for causing the amplifying means to produce simultaneous oscillations at a plurality of frequencies. In the circuits of Figures 1 and 3, selective tuning for operation at particular frequencies is provided in the secondary circuits, whereas, in the circuit of Figure 2 selective tuning is obtained by the resonate circuits directly coupled between the output and input terminals of the amplifier.

Of course, in the device presented in Figures 2 and 3 as with the device presented in Figure 1, additional tuned circuits may be added to produce simultaneous oscillations at additional frequencies. It should be remembered though, that whenever an additional secondary circuit is provided, means should be incorporated for limiting the level of oscillations therein.

As set forth above and as will be appreciated by one of ordinary skill in the art, the circuits presented in Figures 1, 2 and 3 function in a similar manner and to use one of the circuits in a particular type of system, as opposed to another, is a matter of choice and elementary design. For this reason, the following discussion pertaining to the selective systems provided by this invention is developed only around a shunt negative resistance excitation device such as that shown in Figure 1.

In Figure 4, a schematic diagram is presented of a system incorporating bistable secondary oscillating circuits which are excitable by a unitary shunt negative resistance device. The numeral 43 designates a shunt negative resistance device of the type shown in Figure 1 which generates a negative resistance across points 3 and 4. Serially connected across points 3 and 4 are a plurality of primary coils or inductances 48, 58, 59, and 62. Coupled to each coil 48, 58, and 59 is a bistable oscillator 50, 50[1], and 50[11], respectively.

Operation of the circuit of Figure 4 may be best understood if reference is first made to Figure 5 wherein a part of the circuit of Fgure 4 is presented. The bistable oscillator 50, as shown in Figures 4 and 5 includes a tank circuit, consisting of an inductance 49 and a capacitor 51, to which is serially coupled a diode or rectifier 52 and rearwardly of the diode is a capacitor 53 coupled to the system as shown. In Figure 5, a mock circuit comprising means to variably bias diode 52 and means to indicate the values of voltage and current is shown connected in phantom across capacitor 52, or for purposes of clarity, between points 72 and 73.

The tank circuit of bistable oscillator 50, or more particularly coil 49 thereof, is inductively coupled to the shunt negative resistance device 43 via primary inductance 48. The tank circuit, for purposes of illustration, may be assumed to be tuned to a frequency $f_1$. By itself, in accordance with the preceding discussion, the tank circuit would oscillate at frequency $f_1$, or act to generate a negative resistance between points 70 and 71, that is, the negative resistance device 43 would produce oscillations at frequency $f_1$, and hence oscillations would appear across points 70 and 71. It should be understood that the negative resistance excitation device 43 only oscillates when the positive resistance across points 68 and 69 is greater than the negative resistance between those points. When this condition does not exist, negative resistance device 43 does not produce oscillations.

As pointed out above, a diode 52 and capacitor 53 are coupled thereto. According to this invention capacitor 53 is of such value that it acts as a bypass capacitor for frequency $f_1$.

Also coupled in the circuit of Figure 5 is a means for biasing diode 53 in the form of a potentiometer 76 supplied with voltage from batteries 78 and 79. Depending on the setting of the tap on potentiometer 76, the circuit may be placed in two conditions, Condition A and Condition B.

*Condition A.*—If the tap on potentiometer 76 is adjusted such that point 72 is slightly more negative than point 73, diode 53 will be forward biased or in the low impedance region. In this condition at frequency $f_1$, diode 52 and capacitor 53 act as a low impedance across points 70 and 71, lower than the equivalent negative resistance generated between those points. The equivalent negative resistance generated between those points may be considered as an induced negative resistance, and therefore, the relationship may be expressed by stating that the positive impedance offered by diode 52 and bypass capacitor 53 is less than the negative resistance induced in the secondary circuit. When such a condition is present in the secondary circuit no oscillations will be produced because the positive impedance coupled across a shunt negative resistance must be greater than the equivalent absolute value of the negative resistance for oscillations to result as set forth hereinabove. However, in this condition, a small current induced by the battery will flow in the direction of the arrowhead of diode 52.

*Condition B.*—If the tap on potentiometer 76 is adjusted such that point 72 is more positive than point 73, the diode will operate in a high impedance region and the positive impedance across points 70 and 71 is greater than the induced negative resistance generated between those points. As a result oscillations will be produced. The oscillations are rectified by diode 52 and hence current will flow in the same direction as in Condition A, namely, in the direction of the arrowhead of diode 52. The magnitude of the current that flows is determined by the level of the oscillations which in turn is determined by the bias voltage supplied between points 72 and 73.

In accordance with conventional operation, when the polarity between two points in a circuit is reversed, the direction of the current flow between those points will reverse, however, as is apparent from the above discussion, such reversal is not obtained between points 72 and 73 in the secondary circuit of Figure 5. Instead a reversal in voltage applied between points 72 and 73 results in a current in the same direction.

The secondary circuit 50 of Figures 4 and 5 may be said to act as a means for translating the frequency of operation of a negative resistance since the tank circuit which is tuned to frequency $f_1$ extracts energy and supplies a negative resistance between points 72 and 73 which is, through the action of diode 52 and capacitor 53, used to generate a negative resistance around zero frequency or the D.C. level.

This translation may be more clearly understood if reference is made to Figure 6 wherein the operating characteristics of the secondary circuit of Figure 5 are graphically presented. Figure 6*a* is a plot of the current and voltage relationship between points 72 and 73. Between points 102 and 103 on the graph presented in Figure 6*a*, the current read by ammeter 75 increases as the voltage between points 72 and 73 (Figure 5) increases such that point 72 is made less negative with respect to point 73. When the voltage is reversed and increased, that is when point 72 becomes positive with respect to point 73 and the voltage between the points is increased, the current still flows in the same direction and it decreases with an increase in applied voltage as evidenced by the portion of the plot between points 103 and 104.

Thus, the portion of the plot between points 102 and 103 represents the characteristics of the secondary circuit of Figure 5 when diode 52 is operating in the forward biased region or the circuit is in a non-oscillatory state and the portion of the plot between points 103 and 104 represents the characteristics of the secondary circuit of Figure 5 when a negative resistance exists between points 72 and 73, that is when the secondary circuit is in an oscillatory state. The portion of the plot beyond point 104 is shown in phantom because in this region the biasing voltage is so large that the primary source of negative resistance 43 is forced in to its non-linear operating range.

It is important to recognize that when the circuit of Figure 5 is biased for operation between points 103 and 104 of the curve in Figure 6*a*, oscillations are produced between points 70 and 71 at the tuned frequency of the secondary circuit, which oscillations have an amplitude that is approximately linearly proportional to the bias voltage between points 72 and 73. The amplitude of oscillations between points 70 and 71 can be controlled by changing the bias voltage along the axis E of Figure 6*a* between the limits defined by point 103 and a perpendicular from point 104 to axis E.

(1) Since a particular frequency is associated with each secondary circuit as pointed out hereinabove, and (2) since the amplitude of oscillations of a particular frequency is indicative of the state of a particular secondary circuit, the frequency and amplitude of any oscillations in the primary circuit identify each and every secondary circuit and the state in which it is operated. Because of this relationship it should be clear that substitution of an information channel (such as an audio channel) between points 72 and 73 within a range falling within the limits defined by points 103 and 104 of the curve of Figure 6*a* will control the oscillations associated with the secondary circuit in which the channel is placed. In the illustrative embodiment presented, the channel would be placed in series with a fixed bias source. To better understand this aspect of the invention and its practical significance, the requirements of a carrier telephony system should be considered. It is often desirable to take many channels of an audio communication system, have each channel amplitude modulate a different carrier frequency and combine all of these amplitude modulated carriers into a single channel. The devices provided by this invention can serve this function by using the individual audio channels to vary bias in individual secondary circuits tuned to various different carrier frequencies.

When the bias is thus varied, the primary excitation circuit will contain various frequencies amplitude modulated by the individual audio channels.

Figure 5 shows an audio channel in phantom and is designated by the numeral 76[1]. Of course, the channel is serially connected with the biasing means of Figure 5 and shown in phantom because it is only pertinent to operation of an overall system and not pertinent to understanding of basic operation of the circuit of Figure 5.

Figure 6*b* shows a plot of frequency versus the non-complex impedance between points 70 and 71 of the secondary circuit of Figure 5. It will be noted that at the exemplary frequency $f_1$ to which the resonate network of the secondary circuit is tuned, the non-complex impedance between points 70 and 71 becomes negative.

Figure 6*c* presents a graph of frequency versus the non-complex impedance between points 72 and 73 and as is apparent, a negative resistance between these points exists which is centered at, or of maximum magnitude at zero frequency or the D.C. level.

Having thus set forth the operating characteristics of the secondary circuit 50 of the system shown in Figure 4, reference may again be made to that figure concerning the overall operation thereof. The secondary circuit 50 as used in the system incorporates a biasing battery 55 and resistor 54 serially connected in parallel across capacitor 53. This battery-resistor combination serves to forward bias diode 52, or cause the diode to operate in its low impedance range, such that no oscillations are produced in or by the secondary circuit 50. If the bias voltage supplied by battery 55 is momentarily removed, or adjusted such that diode 52 operates in its high impedance range, oscillations will be produced. These oscillations will be rectified by diode 52 and as a result a voltage will build up across capacitor 53 which voltage causes the diode 53 to continue operating in its high impedance range, and secondary circuit 50 to continue to be responsible for the production of oscillations. Thus, if a positive pulse was applied at point 40, secondary circuit 50 would be placed in Condition B referred to above, and primary negative resistance source 43 would produce oscillations of a frequency $f_1$, the exemplary frequency to which the resonate combination of coil 49 and capacitor 51 is tuned. It is thus apparent how one of the secondary circuits 50 may be used to selectively excite the primary negative resistance or excitation device 43.

This invention also provides for other means of excitation, and in Figure 4 the preferred whole selective system is presented incorporating means to selectively initially excite a secondary circuit. The means for selectively exciting the secondary circuits 50 is a unitary device comprising a secondary circuit 60 inductively coupled to the primary negative resistance means 43. Secondary circuit 60 incorporates the same components and operates in the same manner as secondary circuits 10 and 11 shown in Figure 1 and explained with reference thereto. Therefore, it should be apparent that when switch 61 connected across primary coil 62 is open, and capacitor 64 is adjusted such that the tank circuit consisting of coil 63 and capacitor 64 is tuned to a frequency of $f_1$, for example, oscillations of frequency $f_1$ will be produced by primary negative resistance means 43. If the tank circuit in subcircuit 50 is tuned to frequency $f_1$, then oscillations received in secondary circuit 50 will be of sufficient magnitude to build up a voltage across capacitor 53, after their rectification by diode 52, which voltage causes diode 52 to operate in its high impedance range, and secondary circuit 50 would become existed, and remain in its excited state. Oscillations of frequency $f_1$, would continue to be produced by the primary source of negative resistance 43 even if switch 61 were closed for the proper impedance relationship for production of oscillations at that frequency is maintained by secondary circuit 50.

It will be noted that two additional secondary circuits 50[1] and 50[11], which have not yet been discussed, are also incorporated in the system presented in Figure 4. These additional secondary circuits are the same as secondary circuit 50, but they are tuned to two different frequencies, for example, $f_2$ and $f_3$, respectively. It is apparent from the foregoing discussion, that subcircuits 50[1] and 50[11] may be placed in their excited states by adjusting capacitor 64 in the tank circuit of secondary circuit 60 such that that tank circuit is tuned to frequency $f_2$ or $f_3$ respectively. Of course, switch 61 should be open when it is desired to excite either circuit. It should also be apparent that the primary negative resistance device may be caused to produce oscillations of frequencies $f_2$ and $f_3$ by pulsing secondary circuit 50[1] or 50[11] respectively in the same manner as secondary circuit 50 is pulsed to cause production of oscillations of frequency $f_1$.

Also incorporated in the system of Figure 4 is a means for returning the secondary circuits 50, 50[1], and 50[11] to their non-excited states after they have been excited which means is generally designated by the numeral 44. It comprises a variable capacitance 45 serially connected with a coil 46 and switch 47 across the primary negative resistance source, or more particularly points 68 and 69. The capacitor 45 and coil 46 comprise a series resonate network. This network when switch 47 is closed, serves as a short circuit across the primary negative resistance source to all oscillations produced by that source of a frequency equal to, or approximately equal to the frequency to which the resonate network of coil 46 and capacitor 45 is tuned. Thus, to return any one of the secondary circuits 50, 50$^1$, or 50$^{11}$ to its non-excited state, it is only necessary to adjust capacitor 45 such that the series resonate network, of which it is part, is tuned to frequencies $f_1$, $f_2$ or $f_3$ respectively in accordance with the exemplary use of those frequencies hereinabove. Of course, a plurality of secondary circuits may be simultaneously excited or cut-off by applying a single signal having selected frequency phase components.

Another selective system of the type shown in Figure 4 is presented in schematic form in Figure 7. The arrangement of Figure 7 incorporates bistable secondary oscillating circuits of a different type than those presented in Figure 4, however. By referring to Figure 7 it will be noted that only a part of a system utilizing secondary circuits such as that designated by the numeral 120 is shown. However, it will be understood that a system such as that shown in Figure 4 utilizing circuit arrangements of the type shown in Figure 7 is within the intended scope of this invention. Between the primary coil 110 and the secondary coil 112, which coils provide the inductive coupling between the primary source of negative resistance 43, and the secondary circuit 120, is placed a non-linear ferrite material or core 109. A biasing coil 111 is wrapped around the core 109 and connected across the terminals of a core biasing battery 119. The secondary circuit 120 in this arrangement comprises a parallel resonate network consisting of coil 112 and capacitor 113 across which is coupled a resistor 114. According to this embodiment of the invention, the core 109 is biased into a near saturated region by the biasing coil 111 and biasing battery 119. Of course, if desired, the core 109 may be so biased by a permanent magnet. When the core is biased in the saturated region, i.e., near the top of bottom of the hysteresis loop, changes in magnetising force acting on the ferrite will produce only a small change in magnetic flux therein, and hence the negative resistance induced in the secondary circuit which appears between points 120 and 121 will not be sufficient to overcome the circuit losses which occur in the load, as represented here by the resistance 114. Thus, the circuit will not oscillate or be responsible for the production of oscillations. However, if the magnetic bias is momentarily removed, oscillations will begin and continue since while oscillating the ferrite core will be caused to pass through regions in which the change in flux produced by a change in magnetizing force is comparatively large. By so changing the magnetic bias the positive impedance across the negative resistance is made larger than the negative resistance and oscillations are produced by primary negative resistance means 43 and are induced in the tank circuit comprising coil 112 and capacitor 113. Alternately, the secondary circuit 120 may be excited by introducing a signal into the system of a frequency equal to the frequency to which the tank circuit consisting of coil 112 and capacitor 113 is tuned, or a frequency within the bandwidth of that tank circuit. The signal may be introduced across points 115 and 116 by an auxiliary device, may be introduced by a selective exciting circuit such as that designated by numeral 60 in Figure 4, or may be introduced in any other suitable manner which yields the desired result. With the system presented in Figure 7, it is not necessary to incorporate individual limiting means within each secondary circuit of the system, because the level of oscillations will be limited by the hysteresis action of the ferrite core. It should be noted that an information channel as discussed with reference to Figure 5 may be incorporated in the circuit of Figure 7 by placing the channel in series with bias battery 119 and coil 111.

The various means for introducing signals into the system described with regard to Figure 7 are equally applicable to any system within the scope of the invention. For example, input terminals such as those designated by numerals 115 and 116 in Figure 7 may be similarly placed across the circuit of Figure 4, and a signal of a selected frequency may be introduced thereacross to selectively excite a given secondary circuit 50. With this arrangement, selected oscillations may be stopped or a particular secondary circuit returned to its non-excited state by applying a 180° out-of-phase signal of sufficient amplitude, and of the selected frequency across the input terminals.

The plurality of exemplary types of bistable oscillatory secondary circuits discussed in connection with Figures 4 and 7 have various applications beyond the basic systems disclosed. For example, the secondary circuits 50 which incorporate tuned means in the form of a coil 49 and capacitor 51 for producing a negative resistance across two points in the secondary circuit at a band of frequencies centered about the tuned frequency, and means in the form of a diode 52, a capacitor 53, and a biasing arrangement including resistor 54 and battery 55, for causing a second negative resistance to be produced by said first negative resistance at a second band of frequencies centered about zero frequency may be used to excite additional or tertiary circuits. The latter means may be termed the negative resistance frequency translating means. Since secondary negative resistances can be generated having a band of frequencies centered about zero frequency, use can be made of these secondary negative resistances to excite additional isolated circuits. This is accomplished by centering the secondary negative resistances in the negative resistance range, the range being defined by points 103 and 104 of Figure 6. The effect of this centering is to produce AM modulation of the exciting secondary circuit by the excited additional isolated or tertiary circuit.

It should be understood various modifications may be made in the bistable oscillatory circuits presented hereinabove, as well as other secondary circuits, without departing from the scope of this invention. For example, if a Zener diode is used instead of the diode designated by numeral 52 in Figures 4 and 5, it will of itself prevent unrestrained oscillations within the system, and therefore, an additional limiting means may be eliminated. However, in circuits where a limiting means is required, as where conventional diodes are used, the limiting means need not take the form of a conventional diode and battery. Several additional types of limiting means are presented in Figure 9. In Figure 9*a* the numeral 106 designates a neon or glow discharge tube and in Figure 9*b* numeral 107 designates a negative coefficient thermistor. Both of these devices may be used for limiting purposes. In Figure 9*c* still another form of limiting means is shown which comprises a choke coil 108. The coil 108 will, of course, resonate with capacitor 53 if used in a Figure 4 type secondary circuit, however, negative half cycles will be clipped by diode 52 and as a result oscillations produced will have a limited peak to peak amplitude.

Although external input and output connections have not been disclosed in conjunction with every circuit presented herein, it will be understood that desired output signals may be picked up between appropriate points, depending on the signals desired.

As set forth in the objects stated at the outset in this specification, one aspect of the instant invention is to provide a system incorporating secondary circuits which may be used for purposes of amplification, and in Figure 8 three circuit arrangements designated by the numerals 80, 86 and 94 are presented which utilize negative resistance for rather conventional purposes. In circuit arrangement 80 a variable primary inductance 82 is serially connected with a primary source of negative resistance 43. Inductively coupled to the primary coil 82 is a secondary coil 83 and an input coil 81. Connected across secondary coil 83 is a capacitor 84, the coil 83 and capacitor 84 serving as the tank circuit of a secondary circuit 80[1]. The secondary circuit also includes a resistance 85 connected in shunt with the tank circuit. According to the invention, the secondary circuit 80 is stable since the induced negative resistance, as adjusted by the inductive coupling, is made greater than the positive resistance coupled across that negative resistance. However, in the circuit arrangement 80, the positive resistance of the load of the secondary circuit as represented by resistor 84 is partially cancelled by the induced negative resistance. This circuit will therefore amplify a signal of a frequency at or near the frequency to which its tank circuit is tuned, when such signal is introduced across input terminals 81[1].

To express this another way, the secondary circuit incorporates means in the form of a tank circuit which acts in conjunction with the primary source of negative resistance, or excitation device to generate an effective negative resistance across the load coupled thereto whereby the signal appearing across the load is an amplified replicate of the signal introduced in the system for amplification.

It should be understood that primary negative resistance device 43 only produces oscillations in response to an applied signal because of the coupling whereby the positive resistance coupled across the primary negative resistance means is never greater than the negative resistance for operation of secondary circuit 80.

In the circuit arrangement designated by the numeral 86, a primary coil 87, secondary coil 88 and capacitor 89 are provided just as coils 82 and 83 and capacitor 84 are provided in the circuit arrangement 80. Coupled to the tank circuit consisting of coil 88 and capacitor 89 are a diode 90 and capacitor 91. Structurally, the circuit arrangement 86 is similar to that presented in Figure 5. However, coil 87 is variable to provide means for adjusting the inductive coupling between the primary source of negative resistance 43 and the secondary circuit whereby the secondary circuit is stably operated and in place of the battery which would be provided to bias diode 90 in accordance with the teachings of Figure 5, are placed input terminals 93.

With the arrangement incorporating secondary circuit 86, primary negative resistance source 43 is producing oscillations. The variable coupling coil 87 is adjusted to limit the level of the induced negative resistance such that the negative resistance across capacitor 91 is more than the effective positive resistance connected thereacross. Oscillations in the tank circuit, of course, produce the induced negative resistance across the capacitor 91. To bias the secondary circuit for operation in the range between points 103 and 104 of the curve of Figure 6*a*, a bias source should be placed in series with the applied signal across input terminals 93.

This circuit utilizes the frequency translated negative resistance described in particularity with regard to Figure 5 and impresses the same across the serial connection of the load and input terminals and as a result will produce a voltage gain for signals introduced which have a frequency within a range of frequencies around and including zero frequency. For example, the circuit may be used to produce a voltage gain over the audio band, and also may be used as a D.-C. amplifier.

The circuit arrangement designated by the numeral 94 is similar to that designated by numeral 86. However, this circuit which also utilizes the frequency translated negative resistance, produces a current gain. The numerals 95, 96, 97, 98, and 99 designate components which are the same as, and which are connected the same as, components 87, 88, 89, 90 and 91 of circuit arrangement 86. The circuit differs from that designated by numeral 86 in that only a resistance is coupled across the bypass capacitor. Input terminals 100 are provided across resistor 101, and in view of the fact that the circuit utilizes frequency translated negative resistance, it serves as a current amplifier for all signals introduced between terminals 100 which are of a frequency within a range of frequencies around and including zero frequency. Coupling coil 95 is adjusted similarly to coil 87 so that primary negative resistance device 43 is producing oscillations. The coupling is such that the induced negative resistance across capacitor 99 is more than the effective positive resistance of the parallel combination of resistor 10 and the signal source across terminals 100 which combination is in series with bias battery 101[1]. Battery 101[1] is naturally used to bias secondary circuit 94 in the range between points 103 and 104 of Figure 6*a*.

It is apparent that the term biasing a secondary circuit as used herein means biasing of the series diode in the secondary circuit, diode 98 being the series diode in secondary circuit 94.

Of course, it will be appreciated that each of the secondary circuits of Figure 8 include means for introducing a signal into the particular secondary circuit. In the arrangement 80, this means comprises a coil, whereas, in the arrangements 86 and 94, the means comprises a pair of terminals appropriately connected in the circuits. It will also be appreciated that a system may simultaneously incorporate any one of, or all of the types of secondary amplifying circuits shown in Figure 8.

In accordance with conventional designation, the triangles representing amplifiers which are used in Figures 1, 2 and 3 and labeled with numbers 1, 16, and 30 respectively have outputs which are in phase with the input. Because of this, it will be noted that the output leads from amplifier 30 of Figure 3 are crossed to provide the proper phase relationship.

After considering the foregoing description of the exemplary embodiments of this invention in conjunction with the annexed drawings, it will be apparent that there is provided by this invention a device, and systems for use therewith, by which the various objects, phases and advantages herein set forth are successfully achieved. Various modifications of this invention will become apparent to those of ordinary skill in the art after reading this disclosure and, therefore, it is intended that the matter contained in the foregoing description and annexed drawings be interpreted as illustrative, and not in a limiting sense, when consideration is given to the appended claims.

I claim:

1. A selective electronic system comprising an exciting device, said device including means for selectively generating simultaneous basic oscillations at a plurality of frequencies within a predetermined band of frequencies, and a plurality of secondary circuits, wherein said secondary circuits are tuned to different frequencies within said predetermined band and coupled to said exciting device for selective and simultaneous excitation thereby, and wherein said secondary circuits include means for automatically causing said secondary circuits to operate in either of two stable states, at least one of which is oscillatory, during operation of the system.

2. A selective electronic system as defined in claim 1 wherein each of said secondary circuits incorporates means for preventing unrestrained oscillations within the system.

3. A selective electronic system as defined in claim 1 wherein at least one of said secondary circuits is inductively coupled to said excitation device and wherein nonlinear magnetic biasing means is incorporated within the coupling to control the state of operation of said secondary circuit and to limit the level of oscillations produced in said system.

4. An electronic system comprising primary negative resistance means adapted to produce simultaneous oscillations at a plurality of frequencies within a predetermined band of frequencies, and a plurality of isolated secondary circuits tuned to different frequencies within said band, wherein each of said secondary circuits incorporates means to generate a negative resistance at a band of frequencies centered about zero frequency when excited, and wherein said secondary circuits are coupled to said primary negative resistance means whereby said secondary circuits may act as isolated sources of negative resistance when excited by said primary negative resistance means.

5. An electronic system as defined in claim 4 wherein said system further includes unitary means coupled to said primary negative resistance means for causing said primary negative resistance means to produce oscillations of a selected frequency, and wherein said secondary circuits are coupled to said primary negative resistance means whereby said secondary circuits may be selectively and simultaneously excited by said primary negative resistance means and whereby said secondary circuits may cause said primary negative resistance means to produce oscillations of a selected frequency when said secondary circuits are excited by said primary negative resistance means or another means.

6. A selective electronic system comprising excitation means adapted to selectively produce simultaneous oscillations at a plurality of unrelated frequencies; and a plurality of isolated secondary circuits, incorporating tuned means for producing a first negative resistance at a first predetermined band of frequencies, and means coupled to said tuned means for causing a second negative resistance to be produced by said first negative resistance at a second band of frequencies centered about zero frequency; wherein said secondary circuits are coupled to said excitation means whereby said secondary circuits may be selectively and simultaneously excited by said excitation means.

7. A selective electronic system as defined in claim 6 wherein said means coupled to said tuned means comprises rectifying means and filtering means serially coupled to said tuned means.

8. A selective electronic system as defined in claim 7 wherein said secondary circuits further incorporate means for limiting the amplitude of oscillations produced in the system.

9. A selective electronic system comprising shunt negative resistance means for simultaneously producing oscillations at a plurality of frequencies within a predetermined band of frequencies; a plurality of inductances serially connected across said shunt negative resistance means; a plurality of isolated secondary circuits, tuned to different frequencies within said predetermined band, said secondary circuits each being inductively coupled to a different one of said inductances, said secondary circuits each having an oscillatory and non-oscillatory state, and said secondary circuits each being caused to operate in its oscillatory state when oscillations of a selected frequency are induced therein; unitary means inductively coupled to said shunt negative resistance means for causing said shunt negative resistance means to produce oscillations of a selected frequency for causing any selected secondary circuit to operate in its oscillatory state; and unitary means coupled across said shunt negative resistance means for selectively causing any selected secondary circuit operating in its oscillatory state to return to operation in its non-oscillatory state.

10. A selective electronic system adapted to simultaneously amplify a plurality of electrical signals having frequencies within selected bands of frequencies comprising excitation means adapted to simultaneously generate oscillations of a plurality of frequencies within a given band of frequencies; a plurality of secondary circuits tuned to bands of frequencies within said given band of frequencies and having a load coupled thereacross; and a plurality of means for introducing signals to be amplified to different secondary circuits; wherein said secondary circuits are coupled to said excitation device for stable operation of said secondary circuits and wherein each of said secondary circuits incorporates means for generating an effective negative resistance across the particular load coupled thereto in response to oscillations produced by said excitation device having a frequency within the particular band of frequencies to which the secondary circuit is tuned, whereby the signal appearing across the particular load is of the same frequency but larger magnitude than the signal introduced into the secondary circuit to be amplified.

11. A selective electronic system as defined in claim 10 wherein said selected bands of frequencies are centered about zero frequency and wherein said given band of frequencies is centered about a frequency above zero frequency.

12. An electronic system comprising, in combination, a source of negative resistance for simultaneously producing a plurality of oscillations at different frequencies, and a plurality of non-linear excitable secondary tuned circuits coupled to said source of negative resistance, said secondary circuits including means for causing said secondary circuits to offer a greater impediment to excitation thereof as the level of excitation therein decreases.

13. A selective electronic system as defined in claim 12 wherein each of said secondary circuits incorporates means for preventing unrestrained oscillations within the system.

14. An electronic system comprising, in combination, amplifying means for simultaneously producing a plurality of oscillations at different frequencies, and a plurality of non-linear excitable secondary tuned circuits coupled to said amplifying means for excitation by said amplifying means, said secondary circuits including means for causing said secondary circuits to offer a greater impediment to excitation thereof as the level of excitation therein decreases.

15. A selective electronic system as defined in claim 14 wherein each of said secondary circuits incorporates means for preventing unrestrained oscillations within the system.

16. An electronic system comprising, in combination, a source of negative resistance for simultaneously producing a plurality of oscillations at different frequencies, and a plurality of non-linear excitable secondary circuits coupled to said source of negative resistance for excitation by said source of negative resistance, said secondary circuits including tunable means for causing said source of negative resistance to produce oscillations at frequencies to which said secondary circuits are tuned and means for causing said secondary circuits to offer a greater impediment to excitation as the level of excitation therein decreases.

17. A selective electronic system as defined in claim 16 wherein each of said secondary circuits incorporates means for preventing unrestrained oscillations within the system.

18. An electronic system comprising, in combination, amplifying means for simultaneously producing a plurality of oscillations at different frequencies, and a plurality of non-linear excitable secondary circuits coupled to said amplifying means for excitation by said amplifying means, and secondary circuits including tunable means for causing said amplifying means to produce oscillations at frequencies to which said secondary circuits are tuned and means for causing said secondary circuits to offer a greater impediment to excitation as the level of excitation therein decreases.

19. A selective electronic system as defined in claim 18 wherein each of said secondary circuits incorporates means for preventing unrestrained oscillations within the system.

20. A multifrequency excitation device comprising amplifying means having output and input terminals, and means coupled to said amplifying means for rendering said amplifying means capable of simultaneously producing oscillations at a plurality of different basic frequencies, said means coupled to said amplifying means comprising a positive feedback network connected between the output and input terminals of said amplifying means, a plurality of inductances separate from said positive feedback network serially connected across the input terminals of said amplifying means, and a plurality of tuned secondary circuits each of which is inductively coupled to a different one of said inductances.

21. A selective electronic system as defined in claim 20 wherein each of said secondary circuits incorporates means for preventing unrestrained oscillations within the system.

22. A multifrequency excitation device comprising amplifying means having output and input terminals, and means coupled to said amplifying means for rendering said amplifying means capable of simultaneously producing oscillations at a plurality of frequencies, said means coupled to said amplifying means comprising means coupled between the output and input terminals of said amplifying means for selectively varying the impedance between said output and input terminals offered to currents of predetermined frequencies, and separate means coupled across the input terminals of said amplifying means to generate voltages thereacross proportional in magnitude to the magnitude of the currents, and equal in frequency to the frequency of the currents, fed thereto.

23. A multifrequency excitation device comprising amplifying means having output and input terminals, and means coupled to said amplifying means for rendering said amplifying means capable of simultaneously producing oscillations at a plurality of frequencies, said means coupled to said amplifying means comprising a plurality of series resonate circuits tuned to different frequencies and connected between the input and output terminals of said amplifying means, and impedance means connected across the input terminals of said amplifying means, and a plurality of secondary circuits, wherein each of said secondary circuits is inductively coupled to a different one of said plurality of series resonate circuits.

24. A selective electronic system as defined in claim 23 wherein each of said secondary circuits incorporates means for preventing unrestrained oscillations within the system.

25. A multifrequency excitation device comprising amplifying means having output and input terminals, and means coupled to said amplifying means for rendering said amplifying means capable of simultaneously producing oscillations at a plurality of frequencies, said means coupled to said amplifying means comprising a plurality of primary inductances serially connected across the output terminals of said amplifying means; a plurality of secondary inductances serially connected across the input terminals of said amplifier, each of said secondary inductances being associated with and inductively coupled with a different one of said primary inductances; and a plurality of tunable secondary circuits having a single coil means inductively coupled between a different one of said primary inductances and the secondary inductance associated therewith.

26. A selective electronic system as defined in claim 25 wherein each of said secondary circuits incorporates means for preventing unrestrained oscillations within the system.

27. A selective electronic system comprising an exciting device for selectively producing simultaneous basic oscillations at a plurality of different frequencies within a predetermined band of frequencies, and a plurality of tuned secondary circuits, said secondary circuits including means for selectively causing said exciting device to produce oscillations of frequencies to which said secondary circuits are tuned within said predetermined band, said secondary circuits being coupled to said exciting device for selective and simultaneous excitation thereby, and said secondary circuits including means for causing said secondary circuits to operate in either of two stable states, one of which is oscillatory whereby said secondary circuits cause said exciting device to produce oscillations of frequencies corresponding to the frequencies to which said secondary circuits are tuned.

28. An electronic system comprising an exciting device, said device including means for generating simultaneous basic oscillations at a plurality of different frequencies and a plurality of secondary circuits wherein said secondary circuits are tuned to different frequencies and coupled to said exciting device for excitation thereby, each of said secondary circuits including means for amplifying an input signal and modulating the level of the exciting signal in proportion to the amplification of the input signal.

29. A selective electronic system comprising an exciting device, said exciting device including means for selectively producing simultaneous basic oscillations at a plurality of frequencies within a predetermined band of frequencies, and a plurality of secondary circuits, wherein said secondary circuits are tuned to different frequencies within said predetermined band and coupled to said exciting device for selective and simultaneous excitation thereby, and wherein said secondary circuits include means for automatically causing said secondary circuits to operate in either of two stable states, at least one of which is oscillatory, during operation of the system in response to electrical input signals to said secondary circuits either from said exciting device or from a separate signal source.

30. A selective electronic system comprising a unitary exciting device including means for selectively and simultaneously producing a plurality of different electrical oscillations, and a plurality of non-linear excitable secondary tuned circuits coupled to said exciting device, said secondary circuits including means for causing said secondary circuits to offer a greater impediment to excitation thereof as the level of excitation therein decreases and means for automatically causing said secondary circuits to operate in either of two states during operation of the system in response to electrical input signals to said secondary circuits.

References Cited in the file of this patent

UNITED STATES PATENTS

| | | |
|---|---|---|
| 1,446,752 | Kendall | Feb. 27, 1923 |
| 1,604,140 | Affel | Oct. 26, 1926 |
| 1,980,912 | Coupleux et al. | Nov. 13, 1934 |
| 2,067,365 | Whitaker | Jan. 12, 1937 |
| 2,112,267 | Brown et al. | Mar. 29, 1938 |
| 2,288,486 | Rivlin | June 30, 1942 |
| 2,798,953 | Fisher | July 9, 1957 |

FOREIGN PATENTS

| | | |
|---|---|---|
| 896,865 | France | Mar. 6, 1945 |

Notice of Adverse Decision in Interference

In Interference No. 91,375 involving Patent No. 2,897,451, R. B. Hammett, Multifrequency devices and systems associated therewith, final judgment adverse to the patentee was rendered Jan. 17, 1964, as to claims 25 and 27.

[*Official Gazette August 25, 1964.*]